United States Patent [19]

Stambler

[11] E Re. 31,302

[45] Reissued Jul. 5, 1983

[54] VALIDATION SYSTEMS FOR CREDIT CARD OR THE LIKE

[76] Inventor: Leon Stambler, 534 Longacre Ave., Woodhaven, N.Y. 11598

[21] Appl. No.: 59,784

[22] Filed: Jul. 23, 1979

Related U.S. Patent Documents

Reissue of:

[64] Patent No.: 3,786,420
Issued: Jan. 15, 1974
Appl. No.: 227,146
Filed: Feb. 17, 1972

U.S. Applications:

[63] Continuation of Ser. No. 648,522, Jan. 12, 1976, Pat. No. 3,786,420.

[51] Int. Cl.[3] ..... H04Q 9/00; G06K 9/00

[52] U.S. Cl. ..... 340/825.34; 235/375

[58] Field of Search ..... 340/149 A, 149 R, 825.3, 340/825.31, 825.33, 825.34; 235/375, 382

[56] References Cited

U.S. PATENT DOCUMENTS

| | | | |
|---|---|---|---|
| 3,588,449 | 6/1971 | Paterson | 340/149 A |
| 3,609,690 | 9/1971 | Nissman | 340/149 A |
| 3,624,357 | 11/1971 | Wright | 340/149 A |
| 3,665,162 | 5/1972 | Yamamoto et al. | 340/149 A |
| 3,702,392 | 11/1972 | St. Jean | 340/149 A |
| 3,740,530 | 6/1973 | Hoffer et al. | 340/149 A |
| 3,771,128 | 11/1973 | Boardman | 340/149 A |
| 3,794,813 | 2/1974 | Spetz | 340/149 A |

*Primary Examiner*—Donald J. Yusko
*Attorney, Agent, or Firm*—Arthur L. Plevy

[57] ABSTRACT

A credit card validation system employs apparatus which serves to decode validation information contained on the card by means selecting one of a plurality of translators selected at different intervals according to a predetermined format data also contained on the credit card. This uniquely translated information is compared with a secret subscriber number, memorized by the credit card holder, and obtained by him in complete privacy when his account is opened.

19 Claims, 8 Drawing Figures

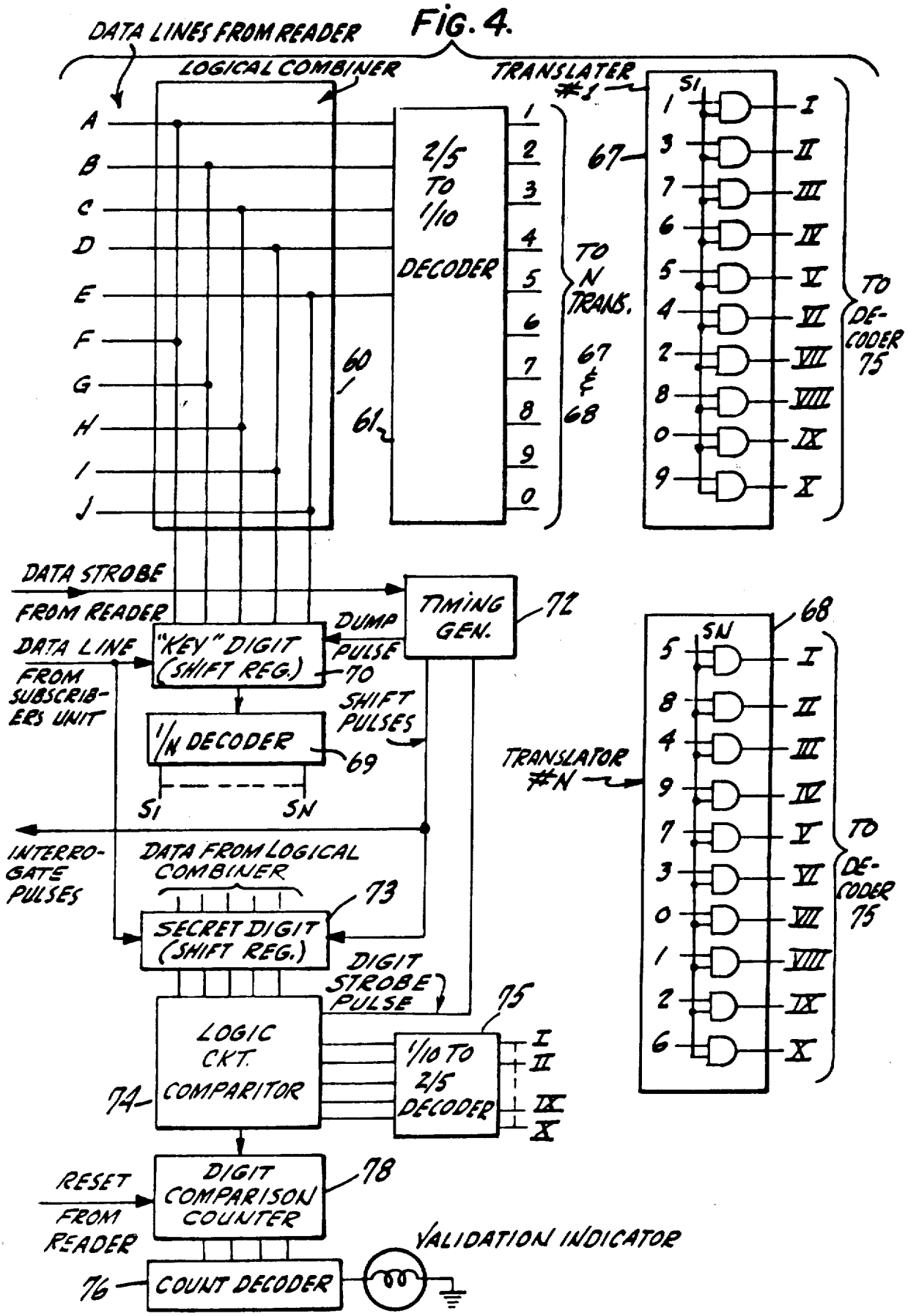
FIG. 4.
DATA LINES FROM READER
LOGICAL COMBINER
TRANSLATER #1
A
B
C
D
E
F
G
H
I
J
2/5 TO 1/10 DECODER
1
2
3
4
5
6
7
8
9
0
TO N TRANS.
67 & 68
60
61
67
S1
I
II
III
IV
V
VI
VII
VIII
IX
X
TO DECODER 75
DATA STROBE FROM READER
TIMING GEN.
72
DUMP PULSE
DATA LINE FROM SUBSCRIBERS UNIT
"KEY" DIGIT (SHIFT REG.)
70
SHIFT PULSES
1/N DECODER
69
S1
SN
68
TRANSLATOR #N
INTERROGATE PULSES
DATA FROM LOGICAL COMBINER
73
SECRET DIGIT (SHIFT REG.)
DIGIT STROBE PULSE
75
LOGIC CKT. COMPARITOR
74
1/10 TO 2/5 DECODER
RESET FROM READER
DIGIT COMPARISON COUNTER
78
VALIDATION INDICATOR
76
COUNT DECODER

VALIDATION SYSTEMS FOR CREDIT CARD OR THE LIKE

Matter enclosed in heavy brackets [ ] appears in the original patent but forms no part of this reissue specification; matter printed in italics indicates the additions made by reissue.

*This is a continuation application of Ser. No. 648,522 filed on Jan. 12, 1976 which was a reissue application of U.S. Pat. No. 3,786,420 issued on Jan. 15, 1974.*

This invention relates to a credit or cash card banking system and, more particulary, to apparatus to be used in such a system for providing an indication that a number memorized by a subscriber corresponds with a coded number on a credit or cash card in the possession of the subscriber.

At the onset it is understood that the term credit or cash card is used in a generic sense to mean any type of information-bearing card such as bank charge cards or cash cards, or identification cards and so on.

Presently the use of the credit or cash card is ever increasing as new applications for the card as well as new card formats are virtually being implemented every day.

The average individual is thoroughly familiar with such cards as used with master charge plans, gas and oil services, banking, airlines and so on, and he is further aware of the possibility and consequences of losing such cards and the subsequent fraudulent use of such a card by an unauthorized person.

While this is a major concern to the subscriber or card holder, it is even of greater concern to banks, gas companies and insurance companies, who oftentimes, due to legislation and so on, must bear the burden of loss due to such fraudulent use.

Literally, according to present statistics, hundreds of thousands of dollars are lost every day due to credit card fraud.

These problems pose the object to devise a system capable of validating or assessing that the person in possession of the card is authorized and entitled to use and possess the same.

Needless to say, the prior art is replete with validation systems which attempt to solve this problem by a number of [differnet] *different* techniques. Basically, any such systems should be simple to operate, easy to install and repair.

This is obvious due to the extensive number of credit cards and the extensive number of both consumers, merchants and banks who would utilize the same.

In conjunction with the above-noted object is the more general object of validation, which is to devise a system wherein the means of accomplishing validation is solely in possession of the rightful owner of the credit or cash card.

It is therefore an object of the present invention to provide an improved and economical system and apparatus for validation of a credit card or cash card.

These and other objects of the present invention provides apparatus for decoding, translating or processing information on a credit or cash card of the type employing a plurality of information-bearing indicia on a surface thereof by utilizing first means responsive to said indicia for providing an electrical signal output, further means are responsive to certain preselected groups of indicia for providing any one of a plurality of control signals, a plurality of decoding, translating or processing means are coupled to said first means each capable of responding to said electrical signal output to provide a decoded signal therefrom according to the format of said decoder, translator or processor, and means are responsive to said control signals and coupled to said decoding means to select any desired one of said decoding *translating or processing* means and to cause the same to provide said decoded *translated or processed* signal according to said certain preselected groups of indicia, whereby different ones of said plurality of indicia are decoded *translated or processed* by different ones of said plurality of decoding *translating or processing* means.

The above apparatus in conjunction with a subscriber memorized number associated with only his credit card affords a validating capability which cannot be easily ascertained by one in possession of the card; and hence guards against unauthorized use of such cards.

These and other objects of the present invention will become clearer if reference is had to the following specification when read in conjunction with the accompanying figures, in which:

FIG. 4 is a schematic diagram in block form of one embodiment of a select translator circuit, the translator units, and the comparison circuit which can be used in the present invention;

Figure 1:
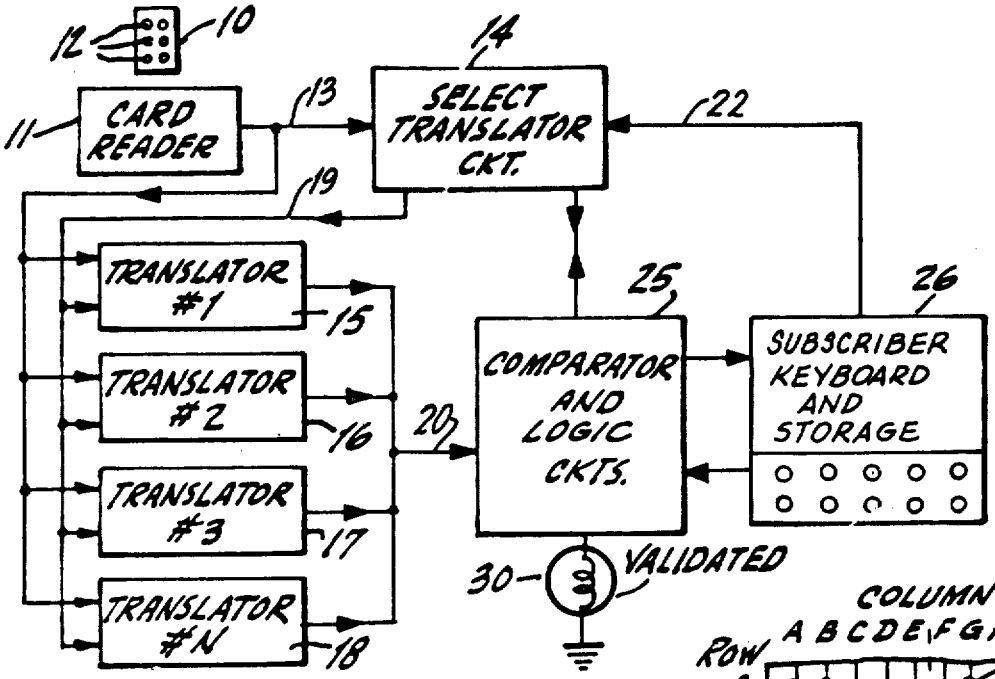
FIG. 1 is a block diagram of a validation system according to this invention.

Referring to FIG. 1, a credit or cash card 10 is about to be inserted into a card reader assembly 11. Card readers as 11 are known in the art and many various types exist. For example of a suitable card reader see my copending application entitled GRAVITY FEED CARD TRANSPORTS AND READERS, filed on May 15, 1970 as U.S. Pat. No. 37,751.

Basically, the credit or cash card 10 has a plurality of information-bearing indicia 12 located on a surface thereof. The information indicia 12 may, for example, be a plurality of apertures arranged in columns and rows and precoded according to some desired format to thereby represent information as relating to a card number or an account number, which may be secret. The information indicia 12 may also be deposited on the card 10 by means of a magnetic stripe or by embossing and so on. Such cards, as well as the plurality of different information-bearing indicia together with suitable card readers 11, are known in the art. The main function of such card readers 11 being responsive to the indicia 12 to provide at an output terminal an electrical signal representative of the information stored. Hence, such readers serve to convert magnetic fields, light an so on to electrical signals.

The card reader 11 further contains a scanning means for reading all the information 12 on the card, which information 12 is generally dispersed over a portion of the surface of the card 10.

The electrical signal provided by the reader 11 is applied to an input of a select translator circuit 14 *via line 13.* The signal output *13* from reader 11 is also applied to a plurality of translator circuits designated as 1 to n and more particularly referenced as 15, 16, 17 and 18, respectively.

Although shown as four translator units 15–18, a greater or lesser number may be conveniently used as will be explained. Each translator unit 15–18 is under control of the select translator circuit 14 which energizes *or selects* these translators according to a decoding *or selection* process which will be explained.

Presently, it is sufficient to state that the translators 15–18 are selected for decoding or processing of certain information groups on the credit card by the response of the selector circuit 14 to other information groups on the card 10 *via lines 13 and 19,* or other information inserted from the [keyboard subscriber 26] *subscriber keyboard 26 via a signal on line 22.* The select translator circuit 14 then serves to energize *or select* one particular translator 15–18. According to data on the card, the selection of a particular translator 15–18 determines which translator will decode the next data group on the card.

The decoded data signal is applied to a comparator circuit 25 *via line 20* which *then* compares the decoded information obtained from the card 10 with information inserted into a storage keyboard 26.

The storage keyboard 26 is operated by the owner or user of the card 10 who inserts therein a "memorized" multi-digit number, which as will be explained is only available to him and which, if correct, will validate that the number decoded from the indicia on the card 10 is valid.

*The word decoded is used in a generic sense and encompasses processing or translation as above indicated.*

The indicator 30 is accessed when validation is completed to notify a merchant and so on that the person presenting the card is authorized.

Before explaining the system operation in greater detail, a brief description of the sequence of events involved in validation according to this system will be given.

A subscriber or card holder possesses both the card 10 and a memorized number. The card 10 has a plurality of information indications thereon which correspond to the memorized number but are arranged and decoded in a manner such that the subscriber will not be able to practically determine how the memorized number corresponds to the information on the card. This feature, as will be explained, is necessary to avoid the possibility of a large number of card holders conspiring to break the code in order to gain access and use of other cards.

The subscriber presents his card to a merchant or a bank teller to complete a transaction. The card is inserted into a card reader as 11 and the subscriber, completely in privacy, inserts the memorized number into the keyboard 26. The system then serves to compare the inserted number with the number shown on the card to register a valid comparison and thereby indicate validation by means of indicator 30. It is also understood that an invalid condition could also be indicated and hence the merchant need not complete the transaction if this occurs[.], *or the subscriber would be denied access.*

From the above description it can be seen that it is important to validation that the information on the card be decoded in a manner to virtually eliminate the possibility of the subscriber from determining how the memorized number corresponds to the data on the card. If this could be done easily, any subscriber could then read any card he desired and operate the system. It is also evident that the assignment of the memorized number be done in as secretive a manner as possible to prevent as few individuals as possible from gaining access to this number. Access to the number by others would jeopardize the subscriber and subject him to possible harm in that there may be an attempt to steal and use his card.

Figure 2:
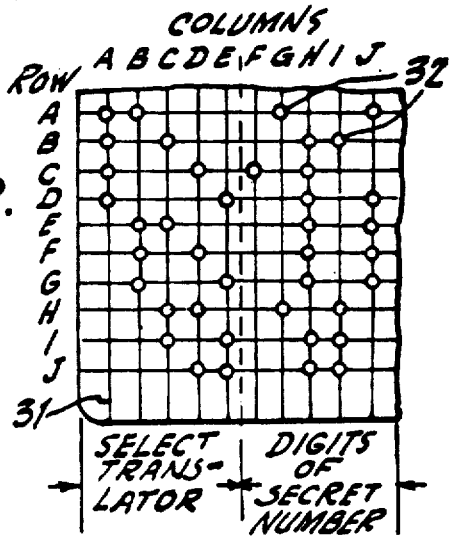
FIG. 2 is a sectional view of a portion of a credit or cash card having a plurality of information-bearing indicia according to this invention.

The solution to these problems will be further explained by referring to FIG. 2 showing that portion of a card 31 containing validation data thereon. The data is shown as a plurality of apertures 32 arranged in rows and columns. However, it is understood that magnetic stripes, embossing and so on can be utilized as well. The apertures 32 are selected to afford a simple explanation of system operation.

According to the embodiment shown in FIG. 2, the data or apertures 32 as stored on the card 31 are presented in two different groups on different halves or portions of the information-bearing surface. One half (left) of the data group represents a code enabling the selection of a translator (15–18 of FIG. 1) and the other half (right) a code to be decoded by that translator selected and representative of a digit of a number stored on the card, which number is to correlate with the subscriber's memorized number.

For example, the data portion is shown as 10 rows A to J and 10 columns A to J. The first five columns (A to E) each contain two apertures or two information bits determinative of a two-out-of-five code. Likewise, the second five columns (F to J) also contain two apertures in each row also representative of a two-out-of-five code.

It is noted that any other code can be utilized as well as a different number of rows and columns.

*It is also apparent, that with magnetic stripes, and so on, in order to select different combinations of bits from the card number, the information must be read into a storage unit.* In the two-out-of-five code two apertures can be placed in one row and five columns in ten unique states, thus defining 10 unique conditions or integers. This feature can be ascertained from FIG. 2 by viewing the aperture formation in columns A to E for rows A to J.

Now assume the card is to be scanned from left to right by column and sequentially commencing from row J to row I to row H and upwards.

The card reader 11 first scans the two apertures located in columns D and E and in row J.

The select translator circuit 14 acknowledging this as the first two bits decodes this two-out-of-five state and energizes one translator (15–18) to cause the same to respond to the next two apertures (columns H and I) of row J. Each translator (1 to n of FIG. 1) is arranged to decode two-out-of-five but each can assign a different number as one to ten to any two identical apertures. For example, it can easily be seen that for the apertures located in columns H and I of row J; this can represent any number between one and ten depending upon the format [of] *or the process or the information stored in* the selected translator.

During the scan of row I the apertures in columns C and E now cause the select translator to energize and therefore activate still another translator of a different format than the first so selected. This different translator will serve to decode the apertures located in rows H and I again. Thus, it can be seen that, for two apertures in the same columns as H and I but in different rows (I and J), by using two different translators one could actually represent two completely different digits.

It can be seen that if one used ten translators with a two-out-of-five code, the number of possible configurations or different formats would be 10 factorial or over 3.5 million possible arrangements.

It is also seen that the card 31 does not have to be arranged as shown in FIG. 2, but the information may alternate from left to right. For example, first select translator information and then decode the next two digits with the selected translator and so on.

The information can be dispersed in other formats on the card under control of the select translator circuitry 14. Hence, while a subscriber knows his secret number, he cannot ascertain how that number correlates to the number on his card.

As indicated, although the format displayed in FIG. 2 is operative, it is not solely definitive of the numerous variations possible in using this decoded approach, or other codes which translate information stored on the card to other numbers.

Figure 3:
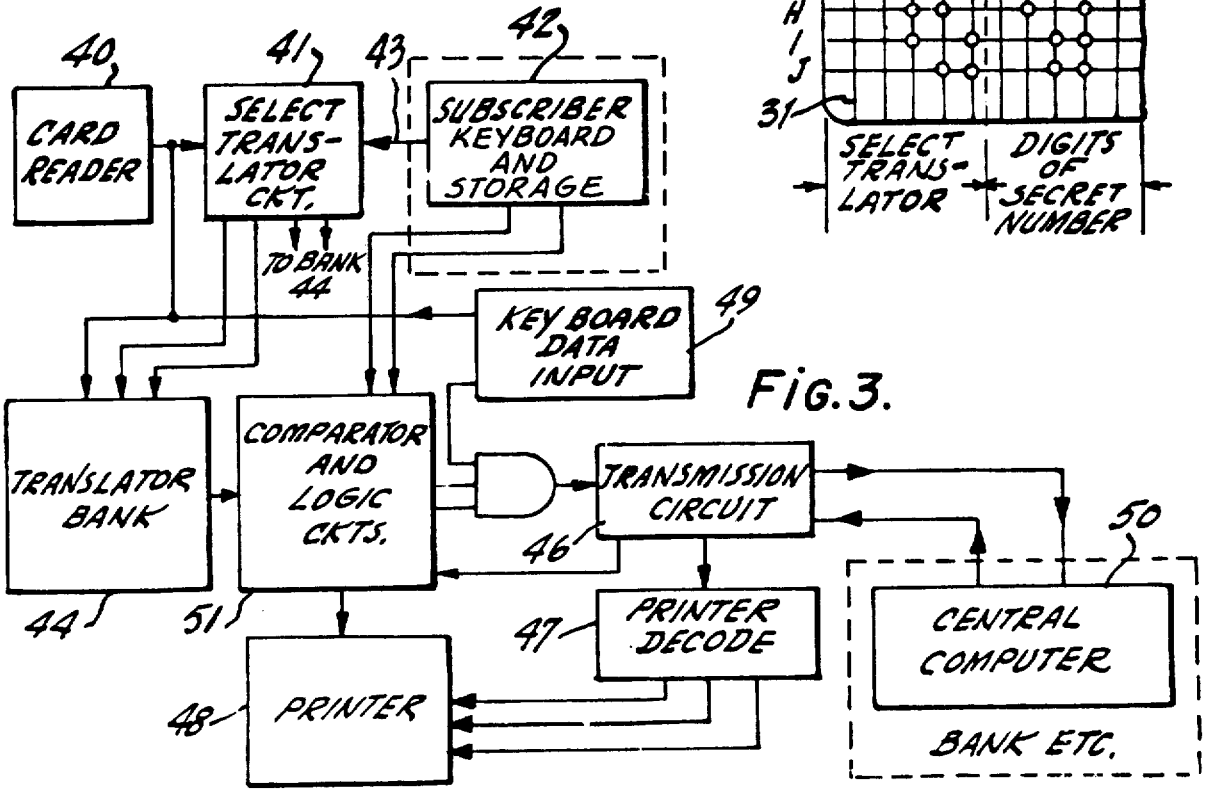
FIG. 3 is a block diagram of a complete system employing validation apparatus according to this invention.

Referring to FIG. 3, there is shown a central computer 50 as part of a bank card system using the validation and card format described above. It is also understood that the validation information contained on the card as 31 of FIG. 2 is not the only information contained thereon. Other information as to an account number and so on may also be present but does not have to be particularly secreted and can be decoded and read by conventional techniques.

The system employs a card reader 40 to receive and read a subscriber's card. A subscriber's [number storage] *keyboard storage* unit and [keyboard] 42 is shown. It is this unit 42, which will be seen, may be a battery operated, hand held unit that the subscriber inserts the memorized number into. *Obviously, this unit can also be permanently connected to the system with a cable.*

Assume the number to be memorized is a four digit number, as for example 8,777. The subscriber would therefore insert this number into the storage and keyboard 42. Shown in FIG. 3 is a lead 43 which couples the unit 42 to the select translator circuit 41. (The hand held unit 42 may be plugged into the reader and translator circuits after the subscriber's number has been entered from the keyboard.)

The first digit 8 of the four digit number is used by the select translator circuit 41 to initially program the unit 41 in one of a predetermined number of translator select sequences. For example, prior to scanning the card via reader 40, the select translator circuit 41 receiving the signal representative of the first two apertures as those in columns D and E of row J, can be made to decode these in any one of ten different states as well and therefore initially commence decoding according to an arbitrary format. The first digit bears no relationship or correlation to any of the digits stored on the cards, but is used as a means of selecting [the translator] *one or more translators* to be used for decoding the data on the card.

The output of the card reader 40 is also applied to a translator bank 44. The translator bank 44 contains a number of translation circuits or memories, each capable of decoding the electrical signal obtained from reader 40 according to a different format as explained. *A translator as defined is any circuit including a memory which interprets or converts information from one form to another.* The translators in bank 44 are selected by the decoding networks contained in the select translator circuit 41 to determine how the number digit information on the card is to be decoded. If the decoded number corresponds to the number the subscriber inserted in the storage keyboard 42, the comparator 51 will indicate a preliminary validation, thus affirming that it is both a valid card and user.

The remaining information on the card as the account number is then translated by an appropriate decoder and transmitted via telephone lines or another medium 46 to the main computer terminal 50.

It is conceivable that a validation terminal might be secured for the purpose of trying to determine the secret numbers of one or more cards, by repeated trial "off-line" (i.e., without use of the remote computer.)

In order to prevent this, the central computer 50 could store one of the digits of the secret number, along with the customer's account number. The secret digit would be sent to the terminal after the customer's account number is received by the computer, and the terminal would then compare it to the secret digit which was entered by the customer from the subscriber's unit 42. Only after the complete secret number is validated, and the selected secret digit from the computer compared correctly, would the validation indicator be energized.

This would not only prevent off-line use of the validation system, but would also prevent any computer operator from obtaining knowledge of the complete secret number of any customer's account.

A keyboard (data input) 49 is utilized to allow the merchant or bank clerk to enter the amounts involved in the transaction and this information is transmitted via transmission circuit 46 to the computer 50 as well. the validation system could also work without the use of a card reader 40. In this method the subscriber's account number would be entered manually from the keyboard data input 49 and after translation, it would be compared to the secret number entered by the customer from the subscriber's keyboard 42.

The computer 50 then processes the information, credits or debits the account and transmits the return message via the transmission circuit 46. A printer decoder 47 operates to decode the computer information, and printer 48 prints out a statement or sales receipt for use of the merchant and consumer. The details of such computer operations in such systems are well known as is the printer and interface equipment as modems and so on. such equipment necessary for the transmission of data over telephone lines are not considered part of this invention.

Basically, the heart of the validation system described above involves the card and the data format or indicia located thereon, the card reader 40, or the customer's account number entered manually from the keyboard data input 49, the select translator circuit 41, the subscriber's number and storage keyboard 42, the translator bank 44 and the comparator and logic circuits 51.

As indicated, the card reader 40 may be of the type shown in my above-noted copending application, although magnetic readers and other types of known card readers will suffice as well.

As shown in FIG. 4, the data from the card reader (as 40 of FIG. [2] *3* is sent to the validator unit on 10 parallel lines (A through J). Lines A through E represent a two-out-of-five code for digits on the left side of the card and lines F through J represents a two-out-of-five code for digits on the right side of the card (see FIG. 2). Lines A through J pass through a logical combiner 60 which logically combines the two sets of five lines into one set of five data lines. The one set of five lines then passes through a two-out-of-five to a one-out-of-ten decoder 61. The unit 61 selects and energizes one out of the 10 outputs for a particular two-out-of-five input code. The outputs of this unit are then connected to N translators (67 and 68). Note that numerical order on the input side of these translators (67 and 68) has been scrambled; so that for translator 1, a 3 is represented by a II, whereas for translator N, a 3 is represented by a VI. (Actually, there are 10 factorial ways of scrambling the inputs and hence over 3.5 million code translations are possible.)

In this embodiment, one different translator (67 and 68) is selected for each digit sent from the card reader. The translator is selected by an SN control signal which is derived from 1 out N decoder 69. The 1 out N decoder 69 decodes the digit which has been stored in the "key" digit shift register 70.

Information for the "key" digit shift register 70 can come from either the data stored on the card or from the data which is stored in the subscriber's keyboard unit (42 of FIG. 3).

Assume, for example, that the first digit in the subscriber's keyboard unit is the "key" digit.

The first data strobe from the card reader causes the timing generator 72 to send interrogate pulses to the subscriber keyboard unit, and shift pulses to the key digit shift register 70. this causes the first (key) digit to be transferred to the key digit shift register, the 1/N decoder 69 now has an output selected, which in turn will select one of the N translators (67–68).

The next strobe pulse from the reader will then cause the next data digit from the reader to be translated and presented as an input to the 1/10 to 2/5 decoder 61. At the same time, the timing generator 72 causes the next digit from the subscriber keyboard unit to be transferred to the secret digit shift register 73. The outputs of the secret digit shift register 73 are presented as an input to the logic circuit comparator. At the same time, the outputs of the 1/10 to 2/5 decoder 75 are presented as an input to the logic circuit comparator 74. The decoder 75 receives the decoded information from the selected translator, which input is to be compared with the contents of the secret digit shift register 73. The strobe pulse from the timing generator 72 samples the comparator circuits 74. If the digit comparison is valid, a logic circuit comparator 74 emits a pulse to the input of the digit comparison counter 75. When the digit comparison counter 75 reaches the desired number of valid counts, the count decoder 76 will sense this number and energize the validation indicator.

Figure 5:
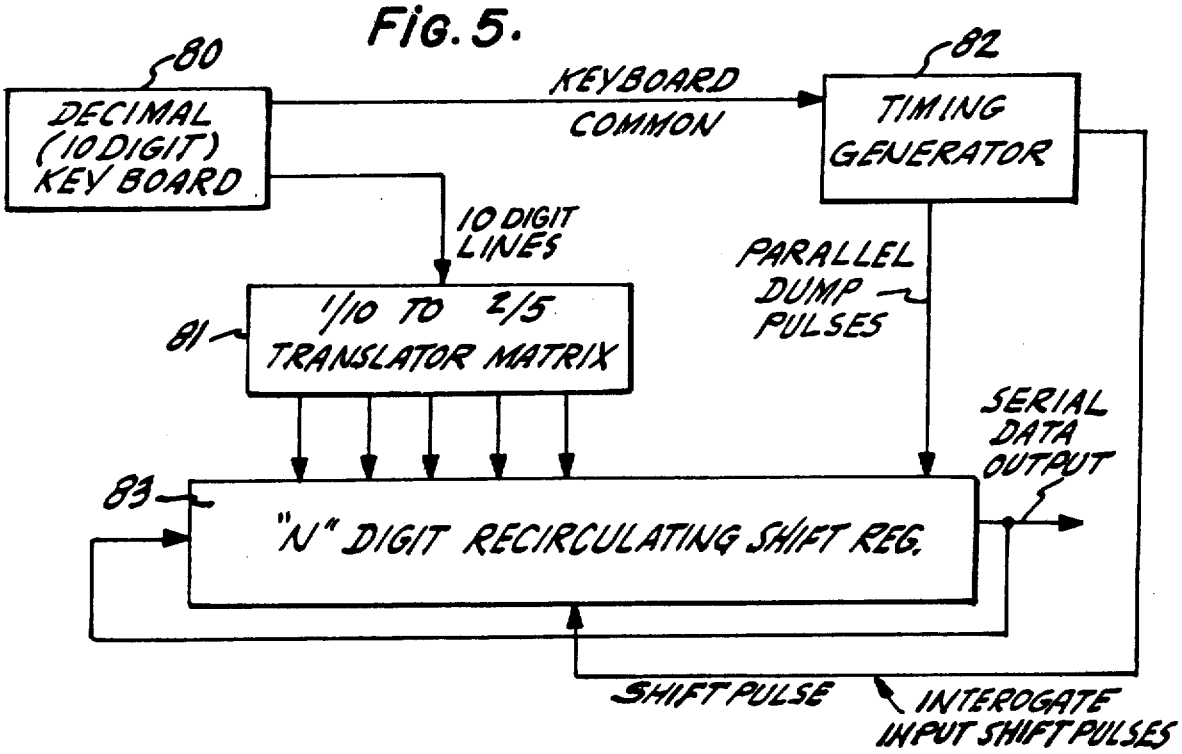
FIG. 5 is a schematic diagram partially in block form of a subscriber's number storage module according to this invention.

Referring to FIG. 5, there is shown an example of a block diagram which can be utilized to function as the subscriber's [number and storage] keyboard module 42 of FIG. 3.

The secret number, (consisting of N digits), is entered by the subscriber with the use of the decimal (10 button) keyboard 80. Each time a button is depressed, a momentary contact (e.g., ground) on one of ten inputs to the 1/10 to 2/5 translator matrix 81 is afforded. Also a keyboard common signal is presented to the input of the timing generator 82 whenever any key on the keyboard is depressed. the translator matrix 81 performs a code conversion from 1/10 to 2/5. The keyboard common signal to the timing generator 82 causes a series of shift pulses to be generated by the timing generator 82. The shift pulses shift the previously stored data over by one digit to prepare for the new digit which is to be stored. The parallel dump pulse then causes the digit on the output of the translation matrix to be stored in the shift register 83.

Information is transferred to the validator of FIG. 4 when interrogate shift pulses are supplied to the shift line by the timing gernator 72 (FIG. 4).

As can be seen from the above description, the subscriber's keyboard and storage unit 42 utilizes digital techniques and therefore can be implemented by utilizing conventional digital logic integrated circuits. Examples of such integrated circuits are those manufactured by Texas Instrument and designated as low power TTL or DTL logic arrays.

Figure 6:
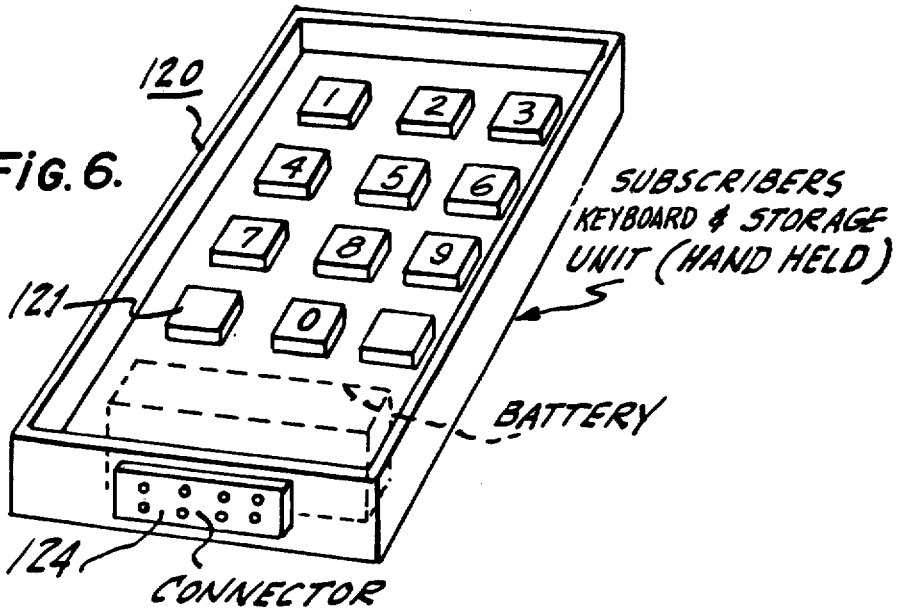
FIG. 6 is a plan view of a mechanical housing configuration of the hand held subscriber's unit shown in FIG. 5.

The entire assembly is quite compact and can be accommodated in a battery operated hand held unit. Such a unit is shown in FIG. 6. The unit 120 has a rectangular case or housing with a telephone like keyboard mounted on a top surface. Note that the keys are recessed to avoid the possibility of accidentally depressing them when the unit is being plugged into the reader. (These could also be a door on top which swings open to expose the keys.)

The unit 120 has a recessed connector 124 located on one side, which connector has a number of terminals necessary to interface with the comparator and select translator logic modules as shown in FIG. 3.

The utility of such a unit as 120 is that a subscriber can use his validatable credit card in a restaurant, gas station and so on.

The merchant or waiter can easily carry the unit 120 and hand it to the subscriber. He then inserts his number in unit 120 by means of the keyboard. The merchant then takes his credit card and the unit 120, and carries them to the card reader and validator circuits (FIG. 7).

Figure 7:
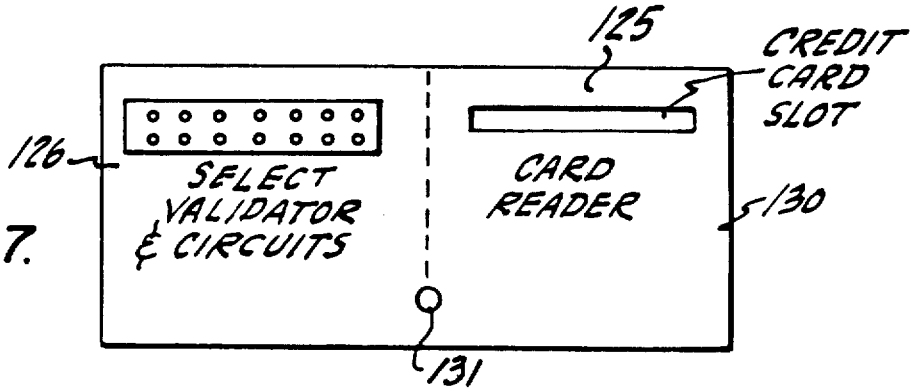
FIG. 7 is a top plan view of a housing for the electronic assembly of a card reader and interface circuitry for the unit of FIG. 5.

These circuits as shown in FIG. 7 are contained within a common module, the top surface of which is shown.

The electronics housing 130 for the reader and circuitry has a card accommodating aperture 125 on the top surface thereof. The merchant inserts the credit card in this slot 125 where it will be read by the card reader apparatus contained in housing 130.

The merchant also plugs the unit 120 into the receptacle 126 also located on a surface of the housing 130.

If the comparator finds the stored number inserted into unit 120 corresponds to the number read from the card as indicated above, a validation light or indicator 131 will light to thereby apprise the merchant that the card is rightfully possessed.

Figure 8:
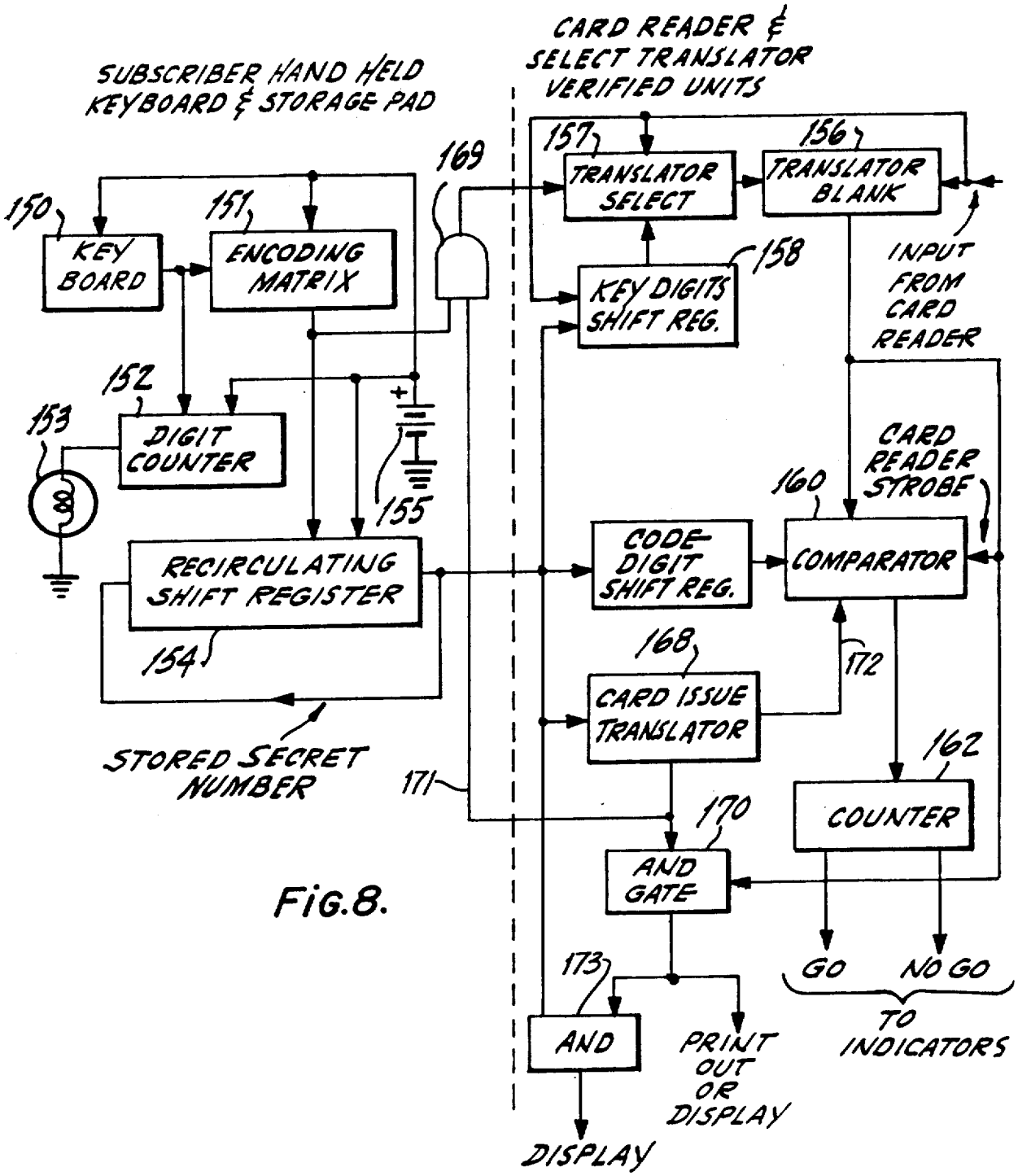
FIG. 8 is a block diagram of apparatus according to this invention including means for issuing a secret *memorized* number to a subscriber.

Referring to FIG. 8, there is shown a subscriber's keyboard and storage module or PAD assembly of another configuration coupled to a card reader and validator units. The apparatus depicted in FIG. 8 also shows circuitry for assigning the secret subscriber's number, which is that number to be memorized and utilized as previously described.

A keyboard unit 150 associated with the subscriber's module is utilized to key in the memorized number to an encoding matrix 151 and to a digit counter 152.

The encoding matrix 151 serves to provide a signal at an output indicative of the key depressed by the subscriber. For example, a depression of key three might provide a two-out-of-five code representation at the output of the encoding matrix 151. The digit counter 152 serves to count each digit the subscriber inserts and provides an output only after the correct number of digits have been inserted. The output of the digit counter 152 may serve to indicate this condition by activating a lamp or indicator 153, thus specifying that all digits have been received.

The encoded digits are coupled and entered into a recirculating shift register 154 which has a storage capacity capable of storing the number of digits of the subscriber's code[.] *or memorized number.*

The contents of the register 154 therefore contain the memorized number.

It is also noted that the subscriber's hand held keyboard and storage pad is operated by a battery 155 as the circuits can be implemented by commonly available integrated circuits, which are low power devices.

As indicated above, after the subscriber inserts the secret number, the keyboard and storage pad unit is plugged into the card reader and select translator module circuitry.

The card reader applies signals to the translator bank 156. The exact translator module in bank 156 is preselected by the first subscriber digit as applied to the translator select network 157 from the key digits shift register 158. Thereafter, as indicated, another translator in bank 156 is selected from data on the card.

The contents of the recirculating shift register are also coupled to code digits shift register 159 *which in turn is connected* to the comparator 160.

The other input to comparator 160 is obtained via the translator bank 156.

As each digit is compared, the comparator which is strobed or interrogated by a pulse from the card reader modules will produce an output pulse indicating a comparison for each digit which is correctly compared. This output pulse is applied to a multi-stage counter 162.

If, at the end of the cycle, the comparator has correctly verified all digits of the secret code, the counter 162 will have reached its desired state and the "GO" line is energized indicating a verification.

If one or more digits do not compare, the counter 162 will not count to the desired state and a "NO GO" condition is indicated, acknowledging that verification has not taken place.

FIG. 8 also has circuitry which is utilized in issuing a secret number to a new subscriber.

When a new card is to be issued, the person (bank director, etc.) authorized to issue such cards enters a "special" predesignated secret number by means of the keyboard 150. The card issue translator module 168 recognizes this number, when any card is read, since the contents of the recirculating shift register 154 are coupled directly to the card issue translator 168.

The card issue translator 168 provides an output signal level *171* upon recognition of the *bank* authorized number. The output level is applied to an AND gate 169 which has another input coupled to the encoding matrix 151 of the storage pad unit. The output of the card issue translator 168 is also applied to the comparator 160 to inhibit the same *via 172* and to an input of an AND gate 170.

The gate 170 has another input applied from the translator bank 156. *The output of gate 170 is also connected to one input of gate 173. The purpose of the gates 170 and 173 are to provide for printing and displaying of the subscriber's memorized number. The output of gate 171 displays digits which are arbitrarily selected by the subscriber to form his memorized number.* The operation is as follows. After the authorized person keys in the secret number, the keyboard unit 150 and associated module is given to the new subscriber. He enters a secured room in which there is a card reader and a validator unit.

He is instructed to place his card into the reader and plug in the keyboard storage pad.

He then keys in any arbitrary number he desires as the first "key" digit using keyboard 150. this is the first number of his secret code and can be any number from 1 to 10[.] *or 0 to 9.* He is, of course, the only one who knows this. The number he inserts into keyboard 150 is decoded by matrix 151 and applied via gate 169 to the select translator unit 157.

Thus, the first digit from his card is decoded by an arbitrary translator selected according to the first number that he has arbitrarily selected. The output of the translator is fed to gate 170, where it is then applied to suitable storage and print out or display circuits. This digit *that was selected* is thereby displayed for the subscriber *via gate 173.* The remaining digits on the card are then decoded as indicated above and displayed as being applied via gate 170 to suitable display networks.

Thus, the number that the subscriber must memorize is the number that is displayed to him. As soon as he is through and has memorized the number, he presses a reset button on the reader which extinguishes the display and resets all the abovenoted circuits to their quiescent state.

In this manner the subscriber is issued a secret number, the first digit of which has been preselected by him and will thereafter be done so, the remaining digits being preselected by the code on the card.

What is claimed is:

1. In a system where the owner of an information bearing card such as a credit card or the like is in the sole possession of a predetermined memorized number of a given number of significant digits, said credit card having on a surface thereof a plurality of first indicia corresponding to said predetermined number and a plurality of second indicia corresponding to a code determining how said first indicia is manifested on said information bearing card, in combination therewith apparatus for verifying that said number and said first indicia correspond, comprising:

a. first means including a keyboard for storing said number after insertion thereby by an owner, b. second means responsive to both said first and second indicia on said credit card for providing at an output thereof an electrical signal according to said indicia, c. third means responsive to a digit of said number as stored to provide a first control signal and then responsive to only said second indicia for providing any one of a plurality of control signals each one operative to determine how said first indicia is to be translated, d. a plurality of translating means coupled to said second means, each one capable of responding to said electrical signal output representative of said first indicia to provide a decoded signal therefrom according to the particular format of said translator, each of said decoded signals representative of a digit contained in said predetermined number when translated according to said second indicia, e. translating selector means responsive to said control signals and coupled to said translating means to cause a first one of said translating means to be selected according to said first control signal and thereafter others of said translating means to be selected according to said plurality of control signals, whereby different selected ones of said translating means provide different digits of said number according to said second indicia on said credit card, and f. comparison means responsive to said decoded signals and said stroed number to provide an output when said decode signals correspond to said stored number, said output verifying that said memorized number and said first indicia on said card correspond.

2. The system according to claim 1 wherein:

a. said first means including a keyboard further comprises a shift register having a storage capability corresponding to said given number of significant digits in said predetermined number.

3. The system according to claim 2 further comprising:

a. a housing of a generally rectangular configuration and having an internal hollow capable of accommodating said first means including said shift register, said keyboard being located in a top surface of said housing.

4. The system according to claim 1 wherein said plurality of translating means are arranged to decode according to a two-out-of-five code format.

5. In a system of the type where the owner of an information bearing card such as a credit card or the like is in sole possession of a predetermined number, which number has a given number of significant digits from one to n, where n is a positive integer greater than one, said credit card having on a surface thereof a plurality of first indicia corresponding to said predetermined memorized number and a plurality of second indicia corresponding to a code determining the translation of such first indicia as present on said surface of said card, in combination therewith apparatus for verifying that said memorized number and said first indicia correspond, comprising:

a. first means including a keyboard for receiving and storing said memorized number after insertion thereby by an owner, b. card reading means responsive to said indicia on said credit card for providing at an output thereof an electrical signal according to said indicia, c. a plurality of selectable translators coupled to said card reading means and each responsive to said electrical signal to provide at an output a decoded signal representative of one of said digits contained in said memorized number when a correct translator is selected according to said second indicia on said card, d. a translator selector circuit, operative in a first or second mode, said selector circuit coupled to said plurality of translator circuits and said card reading means and responsive to said electrical signal to provide a control signal indicative of said second indicia on said card to select one of said plurality of translators for decoding one of said digits according to said second indicia in said second mode, and operative in a first mode responsive to one of said significant digits of said memorized number as stored in said first means for selecting another of said plurality of translators for decoding at least another of said digits independent of said second indicia, and e. comparison means coupled to said output of said translators and said first means for comparing said stored number with said translated decoded signals to provide an output when said decoded signals correspond to said stored number, said output verifying that said memorized number and said first indicia on said card correspond.

6. In a system of the type where the owner of an information bearing card, such as a credit card to the like is in sole possession of a predetermined memorized number of a given number of significant digits, said credit card having on a surface thereof a plurality of indicia representative of first information groups, each group corresponding to one of said digits of said memorized number and second information groups corresponding to a decoding sequence for each one of said first information groups, in combination therewith apparatus for verifying that said memorized number and said first information groups correspond, comprising:

a. first means for receiving and storing said memorized number after insertion thereby by an owner, b. card reading means responsive to said indicia on said card to provide an electrical signal according to said indicia, c. a plurality of selectable translators, each capable of responding to any one of said first information groups to provide at an output a decoded signal representative of one of said first information as corresponding to one of said digits of said memorized number, d. a translator selector circuit, coupled to said first means and said card reading means and operative in a first mode responsive to at least one of said significant digits of said stored number to select one of said translators to cause a first information group to be decoded according to said significant digit, and operative in a second mode responsive to said electrical signal representative of a second information group for selecting one of said translators to cause another first information group to be decoded according to said second information group whereby each one of said first information groups is decoded to correspond with said memorized number under control of at least one digit of said number and said second information and, e. comparison means coupled to said translators and said first means for comparing said memorized number [or] *is* stored with said first information groups as decoded to provide an indication when said number and said decoded first information groups correspond.

7. The system according to claim 5 wherein said first means further comprises a shift register having a storage capability corresponding to said given number of significant digits is said predetermined number.

8. The system according to claim 5 wherein said plurality of translators are arranged to decode according to a two-out-of-five code format.

9. the system according to claim 6 wherein said first means further comprises a shift register having a storage capability corresponding to said given number of significant digits in said predetermined number.

10. The system according to claim 6 wherein said plurality of translators are arranged to decode according to a two-out-of-five code format.

*11. The system according to claim 1, wherein said translating means includes memory means having a plurality of addressable storage locations, with said translator select means capable of selecting said storage locations.*

*12. The system according to claim 1, whereby said system is a connected system.*

*13. The system according to claim 1, wherein said translating means includes a processor.*

*14. The system according to claim 5, wherein said plurality of selectable translators are a plurality of selectable memory locations.*

*15. The system according to claim 5, wherein said system is a connected system.*

*16. The system according to claim 5, wherein said translators are processors.*

*17. The system according to claim 6, wherein said plurality of selectable translators are a plurality of selectable memories.*

*18. The system according to claim 6, whereby said system is a connected system.*

*19. The system according to claim 6, wherein said translators are processors.*

* * * * *